J. BAKER.
DETACHABLE SECURING MEANS FOR TIRES.
APPLICATION FILED FEB. 6, 1906.
913,251.
Patented Feb. 23, 1909.
2 SHEETS—SHEET 1.
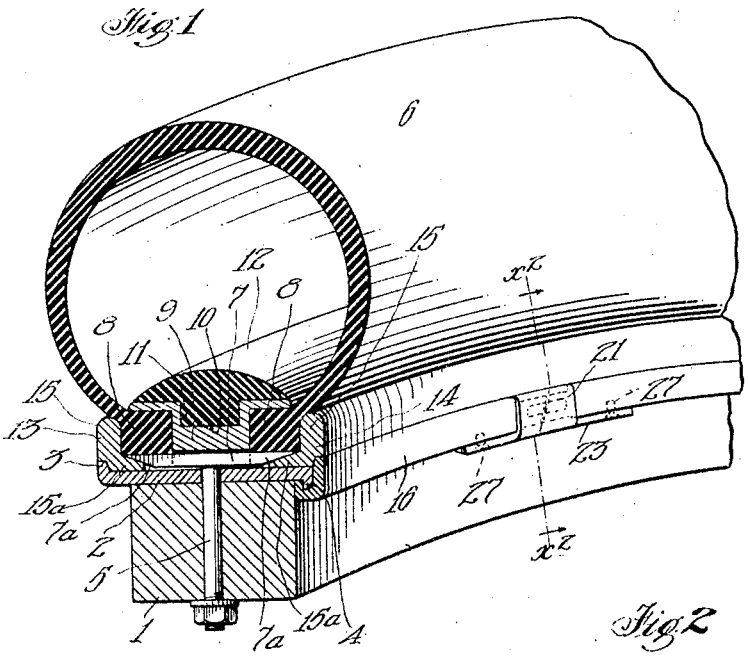
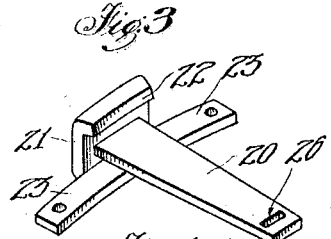
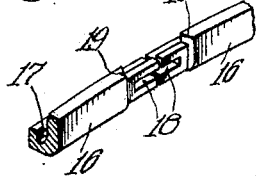
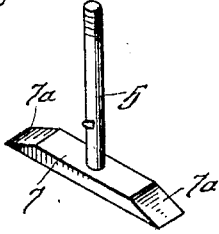
Witnesses
F. A. Mansfield
Frank La Graham
149
Inventor
John Baker
by Townsend Sprout Hackley & Knight
His attys.

J. BAKER.
DETACHABLE SECURING MEANS FOR TIRES.
APPLICATION FILED FEB. 6, 1906.
913,251.
Patented Feb. 23, 1909.
2 SHEETS—SHEET 2.
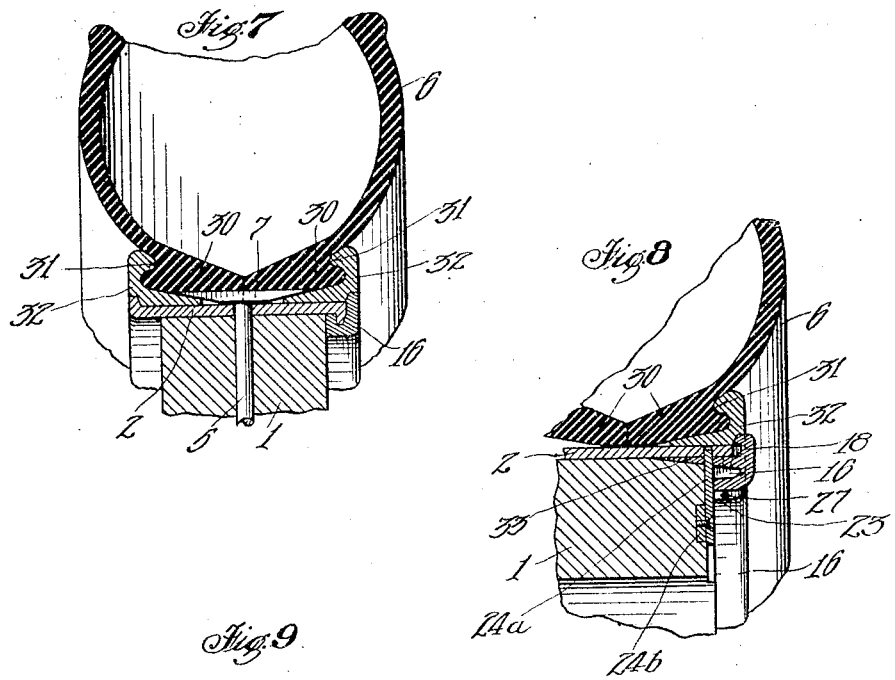
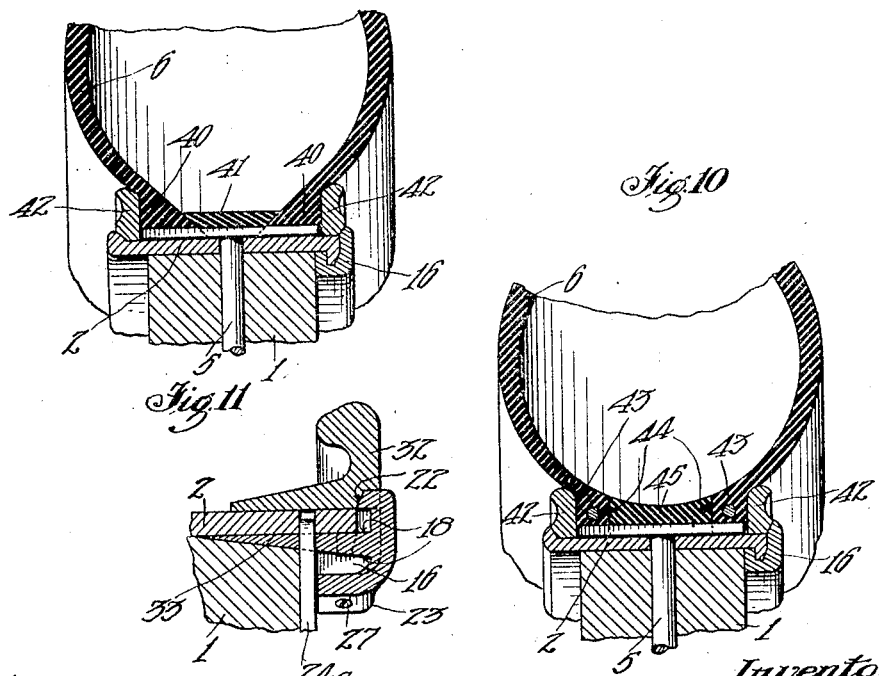
Witnesses
F. W. Mansfield
Frank L. Graham
150
Inventor
John Baker
by Townsend & Lyon, Hackley & Knight
His attys.

UNITED STATES PATENT OFFICE.

JOHN BAKER, OF PASADENA, CALIFORNIA.

DETACHABLE SECURING MEANS FOR TIRES.

No. 913,251.  Specification of Letters Patent.  Patented Feb. 23, 1909.

Application filed February 6, 1906. Serial No. 299,727.

*To all whom it may concern:*

Be it known that I, JOHN BAKER, a citizen of the United States, residing at Pasadena, in the county of Los Angeles and State of California, have invented new and useful Detachable Securing Means for Tires, of which the following is a specification.

My invention relates to means for securing tires, particularly pneumatic tires, detachably to the wheels. In a previous patent of mine, No. 799,293, Sep. 12, 1905, I have shown and described a device of this character in connection with one form of pneumatic tire.

The object of the present invention is to improve the construction of the detaching means to enable the same to be applied to various kinds of tires, especially the forms of tires which are in most common use.

One of the main objects of the invention is to provide a securing means in which, by the removal of a single key and a locking ring, the tire may be slipped bodily off from the rim without any prying, stretching or distorting the shape of the tire in any way, the tire being readily slipped off without requiring any force by the mere removal of a locking ring which is retained by a single key, the locking ring slipping off with the slightest exertion as soon as the key is removed.

The accompanying drawings illustrate the invention, and referring thereto:—Figure 1 is a perspective view partially in section of a portion of a rim and tire equipped with one form of my invention. Fig. 2 is a cross section on line $x^2$—$x^2$ Fig. 1. Fig. 3 is a perspective view showing in detail one form of key. Fig. 4 is a perspective, showing in detail a detent for locking the key. Fig. 5 is a detail in perspective, showing the adjoining ends of the locking ring. Fig. 6 is a perspective in detail of a fastening bolt. Fig. 7 is a sectional view, showing the fastening means applied to another form of tire. Fig. 8 is a sectional view showing another form of key for holding the locking ring in place. Fig. 9 is a sectional view, showing the fastening means applied to still another form of tire. Fig. 10 is a sectional view, showing the fastening means applied to still another form of tire. Fig. 11 is a sectional view enlarged, illustrating a short form of key.

Referring to the form shown in Figs. 1 to 6, 1 designates the felly of the wheel, around which is a metal rim 2 of greater width than the felly. On the inner side of the wheel the rim has an upturned flange 3 and on its outer side a downturned flange 4. The rim 2 is secured to the felly 1 at suitable intervals by means of T-shaped bolts 5. Fig. 6 shows the detail of a bolt, the ends of the head 7 of the bolt being tapered at $7^a$ on both ends, leaving a wedge shaped recess at each end of the head between the head and the rim 2.

6 designates the tire or shoe, the inner edges of which are formed with squared enlargements 8 spaced apart, the faces on the inner perimeter of the enlargements 8 being notched at intervals to receive the heads 7 of the respective bolts 5, and the faces of the inner perimeter of the enlargements 8 are also beveled laterally to conform to the tapered ends $7^a$ of the head 7 so that the inner faces of the tapered portion $7^a$ and head 7 are flush with the inner faces of the enlargements 8. Extending around the tire and filling the space between the enlargements 8 is a metallic clencher ring 9 which is substantially T-shaped in cross section, but has an annular groove 10 which forms a seat for the circular flange 11 of a cushion ring 12 formed preferably of rubber, and upon which the shoe 6 is adapted to bear when the tire is deflated but under duty. Extending around the rim 2 at each edge thereof are retaining rings 13 and 14, both similar in construction, each having a vertical rounded flange 15 which bears against the adjacent enlargement 8 of the shoe. The enlargements of the shoe are thus tightly held against the opposite sides of the clencher ring 9. The retaining rings 13 and 14 have each a tapered flange $15^a$ which allows it to be slipped under the ends of the tapered heads $7^a$ of the bolts 5. The heel of each retaining ring 13 and 14 is recessed annularly and the heel of the retaining ring 13 receives the flange 3 of the rim 2, the flange 3 holding the retaining ring 13 from slipping off, while the recessed heel of the retaining ring 14 receives the upper edge of a locking ring 16. The locking ring 16 is provided with an annular groove 17, as clearly shown in Figs. 5 and 1, which fits over the downturned flange 4 of the rim 2, the locking ring 16 thus holding the retaining ring 14 securely in place.

As clearly shown in Fig. 5, the locking ring 16 is split and the adjoining ends are notched at 18 to form a key slot. The adjoining ends are also recessed, forming shoulders 19. It will be observed that in order to slip the locking ring 16 into place, it must first be contracted so that it will pass by the downturned flange 4 of the rim 2, and when the locking ring 16 is in place against the felly 1, it is expanded to force its groove 17 into engagement with the flange 4 by inserting a key 20 through the key slot formed by the notches 18. The key 20 has a head 21 with a flange 22 with lateral segmental curved wings 23. The key 20 is tapered, as shown, so that as it is forced home, it will spread apart the ends of the locking ring 16 and expand the same clamping it in place. When the key 20 is in position, the head 21 takes into the recess formed at the ends of the locking ring 16, the flange 22 taking into the space between the shoulders 19. It is preferred to slightly taper the shoulders 19 and to correspondingly taper the ends of the flange 22, as shown, to permit easy entrance of the flange. The head 21 of the key when seated projects slightly beyond the outer face of the locking ring 16 as shown in Fig. 1. The key 20, as shown in Fig. 2, projects straight across through the felly 1 below the rim 2, the felly being notched to receive it, and the key 20 is held in place by a detent 24 which is fastened to the felly 1 by a screw 25, the end of the detent 24 projecting through a slot 26 formed in the end of the key 20, as clearly shown in Fig. 3. The wings 23 at the head end of the key are preferably fastened to the locking ring 16 by means of screws 27.

It is obvious from the foregoing description that when the tire is thus fastened to the felly it is securely held thereon against lateral displacement or from creeping. When it is desired to remove the tire, the key 20 is withdrawn, whereupon the locking ring 16 may be contracted and freely withdrawn from its position against the felly. As the retaining ring 14 is thus free to be drawn from the edge of the rim 2, the tire together with the retaining rings 13 and 14 may then be slipped bodily as one mass off from the rim 2, or if desired, the retaining ring 14 only may be removed which will allow the adjacent side wall of the shoe to be pulled out from between the rim 2 and clencher ring 9 to permit access to the interior of the shoe.

In Fig. 7 I have shown another form of tire, having enlargements 30 with annular recesses 31 which receive flanged retaining rings 32. The construction of the rim 2, bolts 5, and locking ring 16 is similar to that of the preceding form described, and the key employed for holding the locking ring 16 in place may be either that of the previous form described, or constructed as shown in Figs. 8 and 11, in which the key 33 has a short shank which passes into a notch formed in the felly. A detent 24$^a$ is screwed to a metal plate 24$^b$ which is sunk in the rim, the detent 24$^a$ projects into a slot in the key 33 to hold the latter in place, and the key otherwise being constructed as the key previously described, the difference being that the shank of the key does not pass entirely through the felly.

In Fig. 9 is shown another form of tire in which the enlargements 40 of the tire are spaced apart by a central ring 41 having tapered edges which fit the adjoining surfaces of the enlargements 40. In this form the retaining rings 42 are of a slightly modified contour in cross section, but are held in place by the construction described in connection with Fig. 1.

Fig. 10 shows still another form which varies slightly from Fig. 9, in that the enlargements 43 have square shoulders 44 between which lies the spacing ring 45.

It will thus be readily seen that the securing means which forms the present invention is applicable to many styles of tires, its essential features being of equal utility and value in all of the forms shown and obviously as well adapted for tires other than those herein shown.

While I consider the form of key which passes entirely through the felly to be the best form, the short key shown in Fig. 8 could be used if desired, and it should be understood that I do not limit myself to either form of key, nor to any special tire.

What I claim is:—

1. A felly, a rim thereon, a tire on the rim, removable retaining rings on the rim engaging opposite portions of the tire, means for holding one retaining ring on the rim, a locking ring for holding the other retaining ring on the rim, each ring having an inwardly projecting flange and non-yielding means secured to the rim below the tire independent thereof forming recesses which receive the flanges of the rings for holding the rings flatly on the rim, and means for detachably securing the locking ring to said rim.

2. A felly, a rim thereon, a tire on the rim, retaining rings on the rim engaging opposite portions of the tire, means for holding one retaining ring on the rim, a locking ring for holding the other retaining ring on the rim, means for detachably securing the locking ring to said rim, and T bolts passing through the felly and rim, and having heads which are received by notches in the tire.

3. A felly, a rim thereon, a tire on the rim, retaining rings on the rim engaging opposite portions of the tire, means for holding one retaining ring on the rim, a locking ring for holding the other retaining ring on the rim, means for detachably securing the locking ring to said rim, and T bolts passing through the felly and rim, the heads of the bolts having tapered ends under which flanges of the retaining rings are received, the tire having notches which receive the heads of the bolts.

4. A felly having a tapered slot, a rim thereon, a tire on the rim, means for retaining the tire on the rim comprising a split locking ring, the ends of which are notched to form a key slot, and a tapered key passing through the slot in the locking ring into the slot in the felly, means for retaining the key in place, and means on the head of the key for covering the joint of the locking ring and positively holding the adjoining ends in alinement.

5. A felly, a rim thereon, a tire on the rim, means for retaining the tire on the rim comprising a split locking ring, the ends of which are notched midway between the upper and lower edges to form a key slot, said ends being recessed to form a wedge shaped seat, and a tapered key passing through the slot into the felly under the rim, the key having a head with a wedge shaped portion fitting the wedge shaped seat in the locking ring, the end of the key having a slot and a detent fastened to the felly and projecting into said latter slot.

6. A felly, a rim thereon having an upturned flange and a downturned flange, T bolts passing through the felly and tire, the heads of the bolts being tapered to form wedge shaped recesses between the rim and heads, a tire on the rim having notches which receive the heads of the T bolts, a retaining ring on the rim between the upturned flange and tire, a portion of the ring projecting into the wedge shaped recesses, a retaining ring on the other side of the tire and also projecting into the adjacent wedge shaped recesses, a split locking ring having an annular groove which receives the downturned flange of the rim, the ends of the locking ring having notches forming a key slot, a tapered key passing through the slot and through the felly and having a slot at its ends which receives a detent secured to the felly, the key having a head at its other end which is partially received by a recess formed in the adjoining ends of the split locking ring, the head having segmental wings which are attached by screws to the locking ring, a clencher ring between the edges of the tire and having a central groove, and a cushion ring in the groove with flanges which project over the clencher ring on both sides of the groove.

In testimony whereof, I have hereunto set my hand at Los Angeles California this 30th day of January 1906.

JOHN BAKER.

In presence of—
GEORGE T. HACKLEY,
VERNA A. TALBERT.